United States Patent [19]
Dethlefs et al.

[11] Patent Number: 5,455,073
[45] Date of Patent: Oct. 3, 1995

[54] METHOD FOR THE PRODUCTION OF A COATING MATERIAL FOR PHOTOGRAPHIC SUPPORTS

[75] Inventors: Ralf-Burkhard Dethlefs; Bernd Scholz; Udo Uyting, all of Osnabrück,, Germany

[73] Assignee: Felix Schoeller jr Papierfabriken GmbH & Co.KG, Osnabrück, Germany

[21] Appl. No.: 75,717

[22] Filed: Jun. 11, 1993

[30] Foreign Application Priority Data

Jun. 12, 1992 [DE] Germany ............... 42 19 194.7

[51] Int. Cl.⁶ ............................................. B05D 3/00
[52] U.S. Cl. ..................... 427/296; 427/391; 430/523; 430/538; 523/351; 524/585; 524/586; 524/587
[58] Field of Search .................. 427/296, 391, 427/393.5; 430/523, 538; 523/351; 524/585, 586, 587

[56] References Cited

U.S. PATENT DOCUMENTS 5,049,595  9/1991  Dethlefs et al. .................. 524/413 X

FOREIGN PATENT DOCUMENTS 63-237927  10/1988  Japan .
2-148032    6/1990  Japan .

*Primary Examiner*—Michael Lusignan
*Attorney, Agent, or Firm*—Horst M. Kasper

[57] ABSTRACT

A method for the production of a photographic coating support material includes a vacuum drying of the synthetic resin and the master batches as well as a storing and transport these products in a closed system with cleaned and dried air.

21 Claims, 1 Drawing Sheet

METHOD FOR THE PRODUCTION OF A COATING MATERIAL FOR PHOTOGRAPHIC SUPPORTS

BACKGROUND OF THE INVENTION

1. Field of the Invention

The present invention relates to a method for the production of a photographic coating support material.

2. Brief Description of the Background of the Invention Including Prior Art

Photographic coating support materials comprise for example photographic base papers with synthetic resin coatings. These synthetic resin coatings are preferably applied on two sides of the base paper and usually comprise a clear polyolefin coating on the back side and a polyolefin coating filled with white pigments on the front side of the base paper. The front side of the base paper is that side which is coated with light-sensitive photographic emulsions during a later processing step.

The synthetic resin coatings are applied according to the melt extrusion process onto the base paper.

Photographic coating support materials of this kind have to be appropriate and suitable for meeting high quality requirements, in particular with respect to the surface properties provided. These surface properties are determined essentially by the synthetic resin coatings, where the synthetic resin coatings have to be as far as possible without fault and free of defects. This requirement is associated with the condition that also the starting materials, which form the synthetic resin coating mass, are to be of a sufficiently high and of an utmost suitable quality.

The essential starting product for providing such a coating is the synthetic resin itself, where the resin is usually a polyolefin, in particular polyethylene.

High-density polyethylene HDPE, low-density polyethylene LDPE, and linear low-density polyethylene LLDPE are employed as polyethylene.

In case of pigment-containing coatings, additionally so-called master batches are admixed. A master batch is a preproduced mixture of high homogeneity of pigment and synthetic resin. White pigments and color pigments are used as pigments. The white pigment employed in connection with photographic coating support materials is predominantly titanium dioxide. The titanium dioxide is present in the master batch in a concentration of generally 50 weight-percent.

Synthetic resins and master batches are available commercially as granules, pellets, or chips.

Synthetic resins and master batches employed according to the present invention are polyolefins and polyolefin master batches. Master batches are premanufactured, well dispersed mixtures of the synthetic resin with white pigments, coloring pigments or dye-stuff or, for example, optical brighteners. Depending on the kind of these pigments, the pigment content can amount of from 0.02 to 76 weight-percent, and preferably from 20 to 50 weight-percent.

Master batches are premelted compositions which are formed to granules, i.e. chips, grains, or pellets, for a better handling.

The melt extrusion in the coating extruder is performed at temperatures between 250° C. and 350° C. Low-molecular components and water are transferred into a gaseous state at these temperatures despite the increased pressure prevailing in the extruder and the low-molecular components and water leave defect locations in the coating after the melt film exits from the T-die of the coating extruder.

Small amounts of humidity result in the so-called water braids. Water braids are localized zones of alternating shiny and matte areas. If the content in humidity is somewhat higher, then the so-called lacing occurs. The term "lacing" denotes holes and slits, respectively, in the extruded film caused by water vapor bubbles. However, lacing can also be caused by low-molecular components with high vapor pressure. The presence of water braids and of lacing results in unusable material.

Less volatile low-molecular components of the coating mass adhere to the lips of the T-die and the less volatile low-molecular components accumulate at the lips of the T-die, and cause then narrow and sharply delineated scratches in the melt film, so-called die stripes. Die strips can be light or dark longitudinal stripes caused by microscratches in the surface of the melt film. The die lips thereupon have to be cleaned, which results in each case in an interruption of the production.

In order to be able to remove and eliminate these interfering materials already prior to the extrusion coating, the starting materials are dried at a temperature of about 80° C. for a time period of up to 24 hours. The temperature and the drying time cannot be increased without limits, because otherwise new problems would occur based on thermal damaging of the polyethylene.

During the drying of master batches with titanium dioxide, very strong degradation and decomposition reactions can occur depending on the drying time, because titanium dioxide promotes this degradation and decomposition. A degradation of the polymer occurs already at a temperature of 80° C. and a drying time from about 1½ to 2 days depending on the type of titanium dioxide. This effect is particularly pronounced in connection with anatase and is observed predominately when high anatase concentrations of more than 10 weight-percent are present in the final product. In case of lower concentrations of anatase, the polymer decomposition and degradation is in fact also present but is not always recognized.

It has been found that the predrying of the starting products does not suffice in each case in order to be able to produce without troubles and interferences. This holds in particular for pigmented synthetic resin coatings and in particular in cases, where the pigment employed in the coating mass is subjected to a post-treatment with aluminum hydroxide, silicon dioxide, and other hygroscopic substances such as it is conventional in connection with titanium dioxide.

Volatile low-molecular components are entered mainly with the plastic into the system. These components are predominantly auxiliary dispersing agents, separating agents, and lubricating agents, for example, metal stearate, polyglycols, waxes.

The Japanese Printed Patent JP 60,089,310 teaches a method for feeding synthetic resin granules into a dryer connected with a vacuum source and a heat source and for making the inside of the dryer vacuum while heating from the periphery of the dryer.

SUMMARY OF THE INVENTION 1. purposes of the Invention

It is an object of the present invention to provide a method for the production of a photographic coating support material, which method eliminates the volatile components, such as water and low-molecular components, volatilized under the conditions of the melt extrusion process from the starting products already prior to the processing to such extent that the volatile components cannot cause any defect locations in the synthetic resin coating.

It is another object of the present invention to prevent lacing in a pigment-coated photographic base paper.

It is a further object of the present invention to produce defect-free and uniform photographic base papers.

These and other objects and advantages of the present invention will become evident from the description which follows.

2. Brief Description Of The Invention

According to the present invention, there is provided for a method for the production of a photographic coating support material. A synthetic resin composition is predried at temperatures of from about 40° C. to 90° C. under vacuum at a pressure of less than 100 mbar. The predried synthetic resin composition is stored in a cleaned and dried gas. The predried synthetic resin composition is transported in a closed system containing a cleaned and dried gas to a melt extruder. The synthetic resin composition is melt-extruded onto one side of a photographic base material in the melt extruder, thereby forming a synthetic resin coating on the photographic base material.

The predried synthetic resin composition can include predominantly a predried synthetic resin, or a predried synthetic resin and a predried synthetic-resin master batch.

A predried synthetic resin and the predried synthetic-resin master batch contained in the predried synthetic resin composition can be mixed with each other while protected under a cleaned and dried gas.

The predried synthetic resin composition can also be mixed with dried additives while protected under a cleaned and dried gas. The cleaned and dried gas can be cleaned and dried air.

A vacuum can be applied during the drying and the synthetic resin composition can be subjected to the vacuum drying for a time period amounting to at least one hour or from about two to nine hours.

The synthetic resin contained in the synthetic resin composition can be a polyolefin. The synthetic-resin master batch contained in the synthetic resin composition can be a mixture of polyolefin and white pigment. The white pigment can be a titanium dioxide of a rutile modification type or of an anatase modification type.

The objects of the present invention are achieved by vacuum drying the starting products at a pressure of less than 100 mbar and at a temperature of from about 40° C. to about 90° C. and by a transport of the component materials with cleaned and dried gas and a storing and maintaining of the component materials with cleaned and dried gas in a system, which is substantially a closed system. The closed system is to prevent that the dried material absorbs moisture again.

A device for the vacuum drying of bulk materials is in principle described in the German Democratic Printed Patent document 107,405. However, neither the bulk material nor the final product, generated after the extrusion coating, is defined more closely in this patent document 107,405. The patent document 107,405 further does not provide any data relating to pressure, temperature, and drying time.

The investigations for the production of photographic coating support materials have shown that, however, a more discriminating approach is necessary in this context. While a drying under vacuum at a temperature of 80° C. for a time period of from 2 to 3 hours is sufficient for the obtaining of coatings in case of unpigmented polyethylene, the drying time for the master batches of the white pigments is increased up to 6 hours. The titanium dioxide, which is employed predominantly for the production of photographic coating support materials, can be present in the rutile or anatase modification and the titanium dioxide is practically always treated on its surface. Inorganic compounds such as aluminum hydroxide, silicon dioxide, zirconium dioxide and/or organic compounds such as amines, alcohols or siloxanes or combinations of these products are employed for the surface treatment of the titanium dioxide. Depending on the kind and the volume of these compounds, which are employed for the surface treatment, there can be necessary in part substantially different drying times of the corresponding master batches. In particular, anatase master batch with a high coating content of the titanium dioxide coated with 2 percent and more by weight of aluminum hydroxide requires longer drying times.

Surprisingly, it has been found that higher pigmented coating masses can be processed without problems with master batches, which are predried under vacuum as compared to batches, which were dried under normal pressure. The maximum pigment content of titanium dioxide in the polyethylene to be processed could be increased for example from about 17 weight-percent to about 22 weight-percent.

The synthetic resin, for example polyethylene, and the synthetic resin master batch, for example polyethylene and titanium dioxide in a mass ratio of 1:1, are dried before they are processed. The dried materials remain in a closed system under dried air and are also mixed within this closed system. This mixture is then guided to the coating extruder proper.

An increase of the pigment content in the surface of photographic coating support materials increases the light reflection and thereby allows to obtain a higher sharpness of photographic pictures. Though the vacuum drying, in particular of the master batches, avoids consequently not only defects in the synthetic resin layer but in addition allows the production of qualitatively higher value photographic images.

In order to be able to fully exploit the advantages of the vacuum drying, a possibility for the picking up of humidity can no longer be given to the predried starting products up to the formation of the molten film in the coating extruder. It is therefore absolutely necessary, starting with the vacuum dryer up to or close to the coating extruder, that a closed system for the storage, for the transport, for the mixing and for the metering is employed, where the system itself is closed. In order to maintain the atmosphere in this closed system as well as for the transport of the starting products generally present in the form of granules, there can only be used cleaned and completely dried gas, and air is favored in view of cost considerations.

The novel features which are considered as characteristic for the invention are set forth in the appended claims. The invention itself, however, both as to its method of operation, its products and physical requirements, together with additional objects and advantages thereof, will be best understood from the following description of specific embodiments and examples when read in connection with the accompanying drawing.

BRIEF DESCRIPTION OF THE DRAWING

In the accompanying drawing, in which is shown one of the various possible embodiments of the present invention.

DESCRIPTION OF INVENTION AND PREFERRED EMBODIMENT

Figure 1:
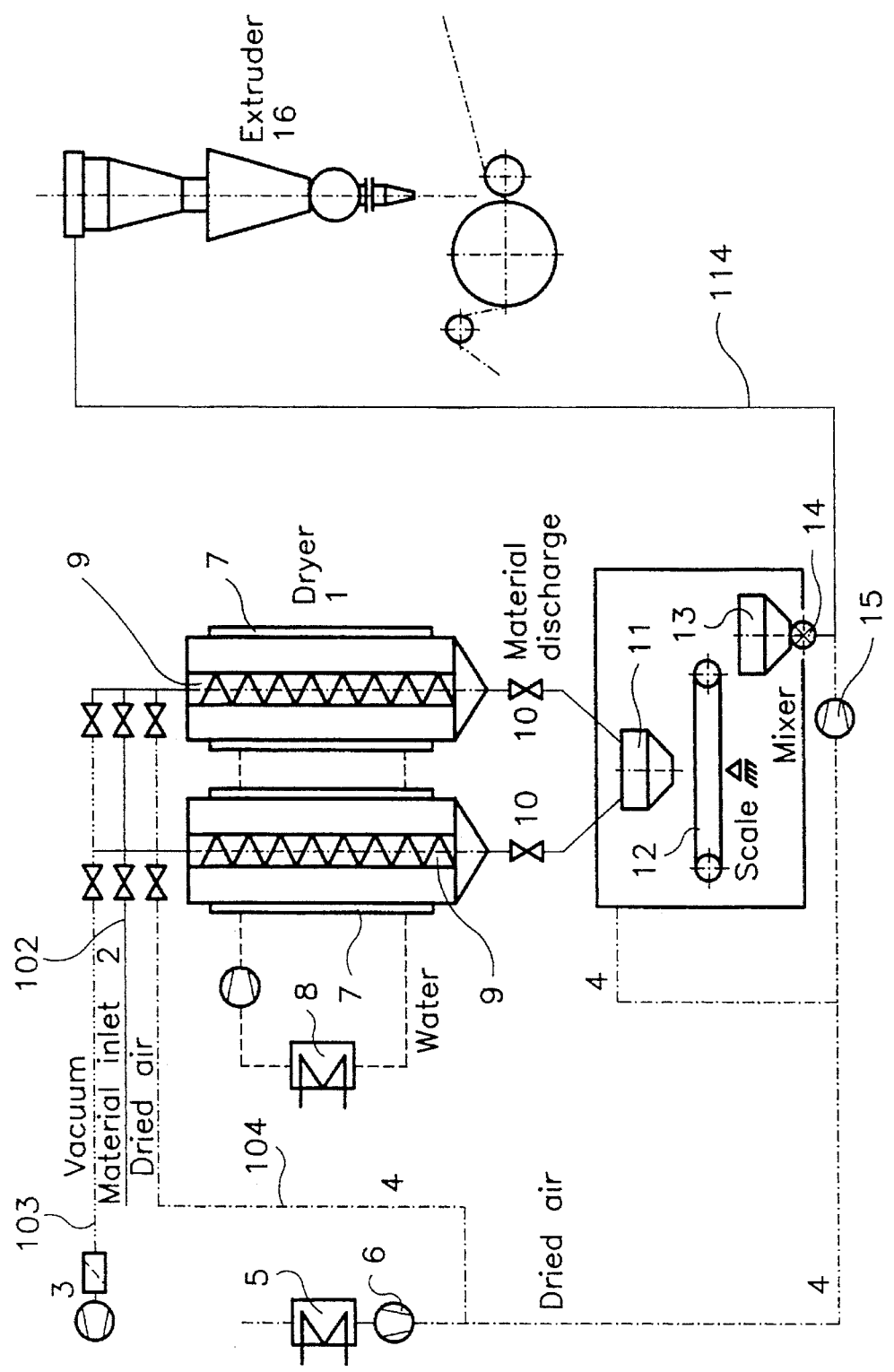
FIG. 1 is a view of a schematic diagram illustrating a system according to the invention.

Conditions, which are used for the vacuum drying in the production of photographic coating materials, were found to be practical as follows:

1. A pressure of less than 100 mbar, and preferably less than 10 mbar;
2. A temperature of from about 40° C. to 90° C., and preferably of from about 60° C. to 80° C.;
3. A drying time of equal to or more than one hour, and preferably of from about two to nine hours.

The product to be melt-extruded can be a synthetic resin composition, where the term "synthetic resin composition" includes for the purposes of the present invention synthetic resins, master batches, and mixtures of synthetic resins and master batches.

Longer drying times are possible without damage, i.e. without decomposition or degradation of the material.

The removal of water is the essential step in the drying process. The drying depends on the partial pressure of the water above the material to be dried, i.e. it can only be dried when the water vapor pressure of the water particles bonded to the material is larger than the water vapor partial pressure of the level of the vacuum applied. At a pressure of 100 mbar, the boiling point of the water is about 46° C. The drying conditions according to the present invention, at pressures of less than 100 mbar and temperatures of from 40° C. to 80° C., are therefore at or, respectively, above the boiling point of the water.

Drying conditions at or, respectively, above the boiling point of water, i.e. at a temperature equal to or more than 100° C., cannot be maintained for a long period of time in the case of ambient air drying under normal pressure, since the material to be dried could not withstand the thermal load.

The predried product can be fed to the further processing without intermediate cooling.

In particular, the temperature and the drying time substantially depend on the humidity content of the starting product to be employed.

The products to be dried are rotated and turned over in the vacuum dryer. The rotation and turning over is performed slowly, gently, and carefully in order to keep a generation of dust, abraded parts, and loose parts to an utmost minimum.

The necessary heat is fed to the vacuum dryers through an outer jacket by means of electrically heated and circulating hot water.

The vacuum dryer operates discontinuously such that several dryers are connected together for obtaining a production without interruption.

The dried and cleaned gas, preferably air, can be preheated to temperatures of up to 40° C. It is also possible to operate the system with dried nitrogen out of a liquid-gas storage tank.

All containers, tubing, pipe lines, and conduits are produced either of stainless steel or made of plastic screw conveyor dryer tubes.

The method for the production of a photographic coating support material, where a continuous base material, such as photographic base paper, is coated by a melt extrusion process, comprises the following steps:

drying of the starting products, synthetic resin and master batch, under vacuum of less than 100 mbar, at a temperature of from about 40° C. to 90° C. for at least one hour, storing, transporting, and other handling of predried starting products with cleaned and dried gas in a system, which is closed in itself, metering and mixing the predried starting products with each other and with other dried additive materials, entering and adding the mixture into a melt extruder with T-die, and combining the melt film with the base material in the lamination station of the coating extruder.

Antioxidants, lubricating agents, antistatic agents, optical brighteners, coloring agents and separating agents are conventionally used and added as auxiliary materials.

The invention method is described in the following in more detail and illustrated based on the diagram of a process flow chart shown in FIG. 1.

FIG. 1 shows as an example two vacuum dryers 1, which are filled with material 2 to be dried. A vacuum generator 3 and a conduit system 4 are connected to the vacuum dryers 1. The conduit system 4 is fed with cleaned and dried air through a preheating stage 5 and a compressor 6.

The vacuum dryers 1 are heated with hot water passed through an outer jacket 7. The hot water is kept in circulation and receives its necessary thermal energy through a heat exchanger 8.

Screw conveyors 9 are disposed inside the vacuum dryer, and the material to be dried is slowly, gently, and carefully moved, rotated, and turned over by the conveyors 9.

After termination of the drying process, the vacuum dryer is filled with the cleaned and dried air. The dried material is discharged through the discharge sliders 10 as desired to the intermediate container 11, then to the scale 12 and to the premixer 13. The conduit lines of the other materials necessary for the final mixture are joining into the premixer, where the other materials are predried according to a like method. Said conduit lines of said other materials are not illustrated in FIG. 1. The intermediate container, the scale, and the premixer are maintained under cleaned and dried air.

The dried final mixture is then transported with compressed air, generated in the compressor 15, to the coating extruder 16 and processed through a cellular-wheel sluice 14.

The material 2 to be dried is fed through the conduit 102 to the vacuum dryer 1. The vacuum dryer 1 is connected to the vacuum generator 3 by the vacuum conduit 103. The cleaned and dried air is fed through a line 104 from the preheating stage 5 and the compressor 6. Then, the cleaned and dried air is fed to the various locations of the closed system such as the vacuum dryer 1, the scale 12, the premixer 13, and the coating extruder 16. The conduit 114 serves for transporting the dried final mixture from the cellular-wheel sluice 14 to the coating extruder 16 together with the cleaned and dried air coming from the compressor 15.

The following examples further illustrate the invention:

Table 1 shows the starting products with their residual humidities and the data of the predrying

TABLE 1

| | Starting product | Drying conditions | | | Humidity content in ppm | |
|---|---|---|---|---|---|---|
| | | Pressure mbar | Temp. °C. | Time hrs. | prior drying | after drying |
| | A1 HDPE* | <10 | 80 | 3 | 620 | 240 |
| | A2 LDPE** | <10 | 80 | 3 | 900 | 300 |
| Comp. | A3 LDPE | | | 0 | 1800 | 1800 |
| | A4 LLDPE*** | <10 | 50 | 6 | 860 | 210 |

TABLE 1-continued

| | Starting product | Drying conditions | | | Humidity content in ppm | |
|---|---|---|---|---|---|---|
| | | Pressure mbar | Temp. °C. | Time hrs. | prior drying | after drying |
| | B1 MB-Rutile° | <10 | 80 | 4 | 1050 | 280 |
| | B2 MB-Rutile | <10 | 80 | 6 | 1050 | 100 |
| Comp. | B3 MB-Rutile | 1016 | 80 | 4 | 1050 | 500 |
| | C1 MB-Anatase°° | <10 | 80 | 7 | 1100 | 90 |
| Comp. | C2 MB-Anatase | 1016 | 80 | 6 | 1100 | 440 |
| Comp. | C3 MB-Anatase | 1016 | 90 | 4 | 1100 | 610 |

\*HDPE = High density polyethylene
\*\*LDPE = Low density polyethylene
\*\*\*LLDPE = Linear low density polyethylene
°MB-Rutile = Master batch of LLDPE with 50 weight-percent titanium dioxide of the rutile type
°°MB-Anatase = Master batch of LLDPE with 50 weight-percent titanium dioxide of the anatase type Table 2 shows the composition of the coating masses.

TABLE 2

| Example | | Starting products in weight-percent | | | | | | | | | |
|---|---|---|---|---|---|---|---|---|---|---|---|
| | | A1 | A2 | A3 | A4 | B1 | B2 | B3 | C1 | C2 | C3 |
| 1° | | 27 | 64 | — | 9 | — | — | — | — | — | — |
| 2* | | 7.5 | 52.5 | — | 15 | 25 | — | — | — | — | — |
| 3* | | 7.5 | 52.5 | — | 15 | — | 25 | — | — | — | — |
| 4* | | 7 | 49 | — | 14 | — | — | — | 30 | — | — |
| V1° | Comp. | 27 | 9 | 64 | — | — | — | — | — | — | — |
| V2* | Comp. | 7.5 | 52.5 | — | 15 | — | — | 25 | — | — | — |
| V3* | Comp. | 7 | 49 | — | 14 | — | — | — | — | 30 | — |
| V4* | Comp. | 7 | 49 | — | 14 | — | — | — | — | — | 30 |

*As a master batch the following was added to the mixtures:
0.5 weight-percent ultramarine blue,
0.2 weight-percent calcium stearate.
°The mixtures 1 and V1 were applied to the back side of a photographic base paper and the remaining mixtures were applied to the front side of the photographic base paper.
All components were processed in a closed system with the cleaned and dried air. The mixtures were processed in a coating extruder at 310° C. to molten films. The molten films were applied at 30 g/m² to a photographic base paper, which had been previously subjected to a corona treatment.

Table 3 shows the results of the tests.

TABLE 3

| Example | | Occurrence of water braids and lacing, respectively | Occurrence of die stripes |
|---|---|---|---|
| 1 | | not at all* | not at all* |
| 2 | | not at all* | not at all* |
| 3 | | not at all* | not at all* |
| 4 | | not at all* | not at all* |
| V1 | comparison | immediately | after 8 hours |
| V2 | comparison | immediately | after 18 hours |
| V3 | comparison | after 10 minutes | after 20 hours |
| V4 | comparison | immediately | after 14 hours |

*'not at all' means "did not occur after 5 days of production"

It will be understood that each of the steps, conditions and reagents described above, or two or more together, may also find a useful application in other types of extrusions, coating procedures, and laminated products differing from the types described above.

While the invention has been illustrated and described as embodied in the context of a method for production of a coating material for photographic supports, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method for the production of a photographic coating support material comprising predrying a synthetic resin composition at temperatures of from about 40° C. to 90° C. under vacuum at a pressure of less than 100 mbar;

storing the predried synthetic resin composition in a cleaned and dried gas;

transporting the predried synthetic resin composition in a closed system containing a cleaned and dried gas to a melt extruder;

melt-extruding the synthetic resin composition onto one side of a photographic base material in the melt extruder, and thereby forming a synthetic resin coating on the photographic base material.

2. The method according to claim 1, wherein the predried synthetic resin composition includes predominantly a predried synthetic resin.

3. The method according to claim 1, wherein the predried synthetic resin composition includes predominantly a predried synthetic resin and a predried synthetic-resin master batch.

4. The method according to claim 3, further comprising mixing a predried synthetic resin and the predried synthetic-resin master batch contained in the predried synthetic resin composition with each other while protected under a cleaned and dried gas.

5. The method according to claim 1, further comprising mixing the predried synthetic resin composition with dried additives while protected under a cleaned and dried gas.

6. The method according to claim 1, wherein the cleaned and dried gas is cleaned and dried air.

7. The method according to claim 1, further comprising applying a vacuum during the drying and subjecting the synthetic resin composition to the vacuum drying for a time period amounting to at least one hour.

8.. The method according to claim 1, further comprising applying a vacuum during the drying and subjecting the synthetic resin composition to the vacuum drying for a time period amounting to from about two to nine hours.

9. The method according to claim 2, wherein the synthetic resin contained in the synthetic resin composition is a polyolefin.

10. The method according to claim 3, wherein the synthetic-resin master batch contained in the synthetic resin composition is a mixture of polyolefin and white pigment.

11. The method according to claim 10, wherein the white pigment is a titanium dioxide of a rutile modification type.

12. The method according to claim 10, wherein the white pigment is a titanium dioxide of an anatase modification type.

13. The method according to claim 4, further comprising mixing the predried synthetic resin composition with dried additives while protected under a cleaned and dried gas, wherein the cleaned and dried gas is cleaned and dried air, applying a vacuum during the drying and subjecting the synthetic resin composition to the vacuum drying for a time period amounting to from about two to nine hours, wherein the synthetic-resin master batch contained in the predried synthetic resin composition is a mixture of polyolefin and white pigment, and wherein the white pigment is a titanium dioxide of a rutile modification type.

14. The method according to claim 4, further comprising mixing the predried synthetic resin composition with dried additives while protected under a cleaned and dried gas;

applying a vacuum during the drying and subjecting the synthetic resin composition to the vacuum drying for a time period amounting to at least one hour;

wherein the synthetic-resin master batch contained in the synthetic resin composition is a mixture of polyolefin and white pigment, wherein the white pigment is a titanium dioxide of a rutile modification type, and wherein the drying is performed in vacuum dryers having screw conveyors disposed inside for moving the master batch material.

15. A method for the production of a photographic coating support material comprising a photographic base material with a synthetic resin coating on at least one side, wherein the synthetic resin coating comprises predominately at least one of synthetic resin and synthetic resin plus synthetic-resin master batch, and wherein the synthetic resin coating is applied by means of a melt-extrusion process to the photographic base material, wherein at least one of the synthetic resin and the synthetic-resin master batch is dried at temperatures of from about 40° C. to 90° C. under vacuum at a pressure of less than 100 mbar, the predried synthetic resin and the predried synthetic-resin master batch is stored in cleaned and dried gas, the predried synthetic resin and the predried synthetic-resin master batch are transported in a closed system with cleaned and dried gas, the predried synthetic resin and the predried synthetic-resin master batch, corresponding to a mixing composition of the synthetic resin coating, are mixed with each other and possibly with further dried additives under cleaned and dried gas, the produced mixture is transported with cleaned and dried gas to a melt extruder.

16. The method according to claim 15, wherein the cleaned and dried gas is cleaned and dried air.

17. The method according to claim 15, wherein a time period of the vacuum drying amounts to at least one hour, and preferably from about two to nine hours.

18. The method according to claim 15, wherein the synthetic resin is a polyolefin.

19. The method according to claim 15, wherein the synthetic-resin master batch is a mixture of polyolefin and white pigment.

20. The method according to claim 19, wherein the white pigment is a titanium dioxide of a rutile modification type.

21. The method according to claim 19, wherein the white pigment is a titanium dioxide of an anatase modification type.

* * * * *